United States Patent [19]
Nijenhuis

[11] Patent Number: 5,807,057
[45] Date of Patent: Sep. 15, 1998

[54] TRANSPORT VEHICLE FOR TAKING UP AND TAKING DOWN CONTAINERS AND THE LIKE ONTO OR FROM A LOADING PLATFORM THEREOF

[75] Inventor: Derk Nijenhuis, Hoogeveen, Netherlands

[73] Assignee: N.C.H. Hydraulische Systemen B.V., Hoogeveen, Netherlands

[21] Appl. No.: 633,724

[22] PCT Filed: Oct. 20, 1994

[86] PCT No.: PCT/NL94/00257

§ 371 Date: Jul. 3, 1996

§ 102(e) Date: Jul. 3, 1996

[87] PCT Pub. No.: WO95/11143

PCT Pub. Date: Apr. 27, 1995

[30] Foreign Application Priority Data

Oct. 20, 1993 [NL] Netherlands .......................... 9301816

[51] Int. Cl.$^6$ ................................ B60P 1/64; B62D 61/12
[52] U.S. Cl. ........................ 414/475; 280/414.5; 280/767
[58] Field of Search .................................. 414/474–476, 414/480, 494, 500, 482–485; 298/175; 180/24.02; 280/414.5, 767, 43.23

[56] References Cited

U.S. PATENT DOCUMENTS

| | | |
|---|---|---|
| 3,454,175 | 7/1969 | Kellaway . |
| 4,063,745 | 12/1977 | Olson ................................. 414/476 X |
| 4,274,656 | 6/1981 | Warren ................................ 280/767 X |
| 4,605,086 | 8/1986 | Marom ................................ 280/767 X |
| 4,824,133 | 4/1989 | Wilson ................................ 280/767 X |
| 5,009,567 | 4/1991 | Fenton ................................ 414/425 X |
| 5,173,028 | 12/1992 | Heikkinen et al. ................ 414/425 X |
| 5,263,807 | 11/1993 | Pijanowski ............................. 414/480 |

FOREIGN PATENT DOCUMENTS

| | | |
|---|---|---|
| 2 231 601 | 12/1974 | France . |
| 1 430 694 | 11/1968 | Germany . |
| 2 222 539 | 11/1973 | Germany . |
| 2 545 934 | 4/1977 | Germany . |
| 8 801 783 | 2/1990 | Netherlands . |

*Primary Examiner*—David A. Bucci
*Attorney, Agent, or Firm*—Young & Thompson

[57] ABSTRACT

A vehicle is provided with a tiltable loading platform and an engaging device to control the movement of containers onto and off of the loading platform. Auxiliary wheels or rollers attached to a slidable carrier can be lowered into a position in which they contact the surface supporting the vehicle. The auxiliary wheels or rollers may rotate about an axis parallel to the axles of the vehicle and bear a portion of the overall load during loading/unloading, thereby providing additional support for the rearmost wheels and axle. In addition to or instead of such an orthogonal arrangement, auxiliary wheels or rollers may be provided which rotate about an axis which lies at an angle to the vehicle axles. Position corrections of the vehicle can be performed during loading and unloading by moving the vehicle forward or backward with such angled rollers or wheels in contact with the surface supporting the vehicle.

6 Claims, 4 Drawing Sheets

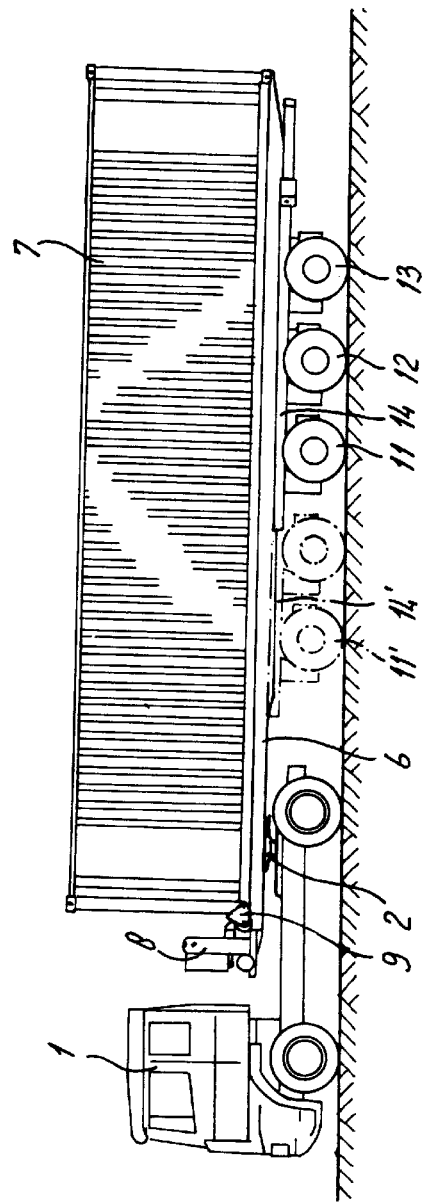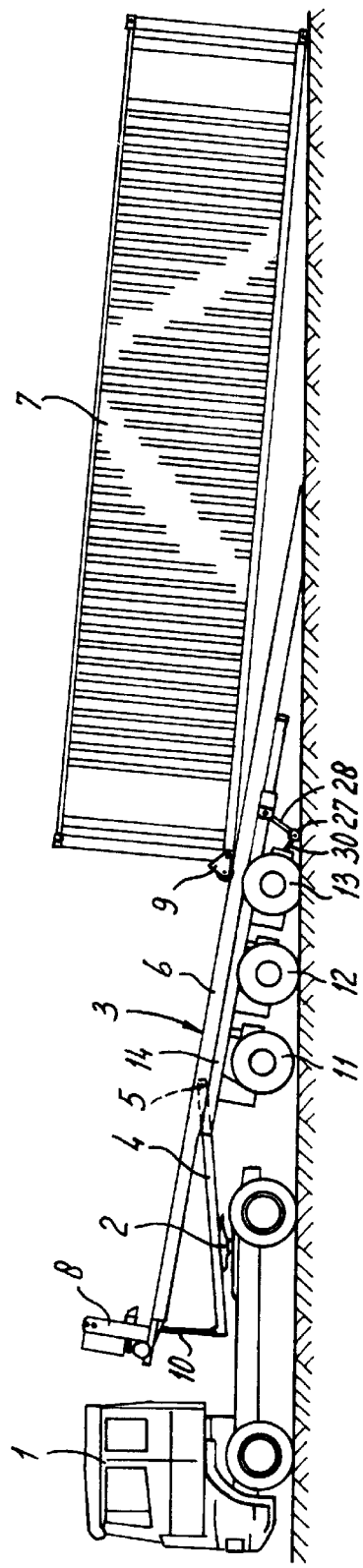

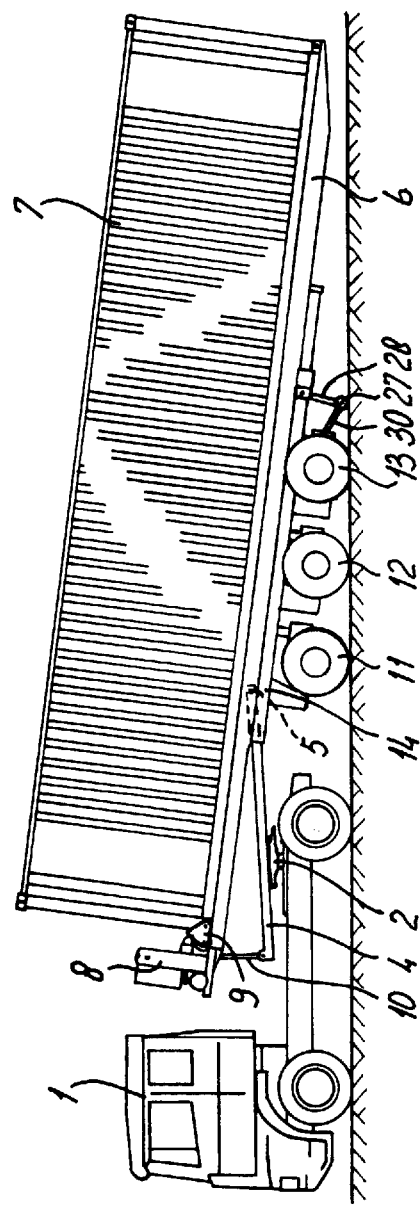

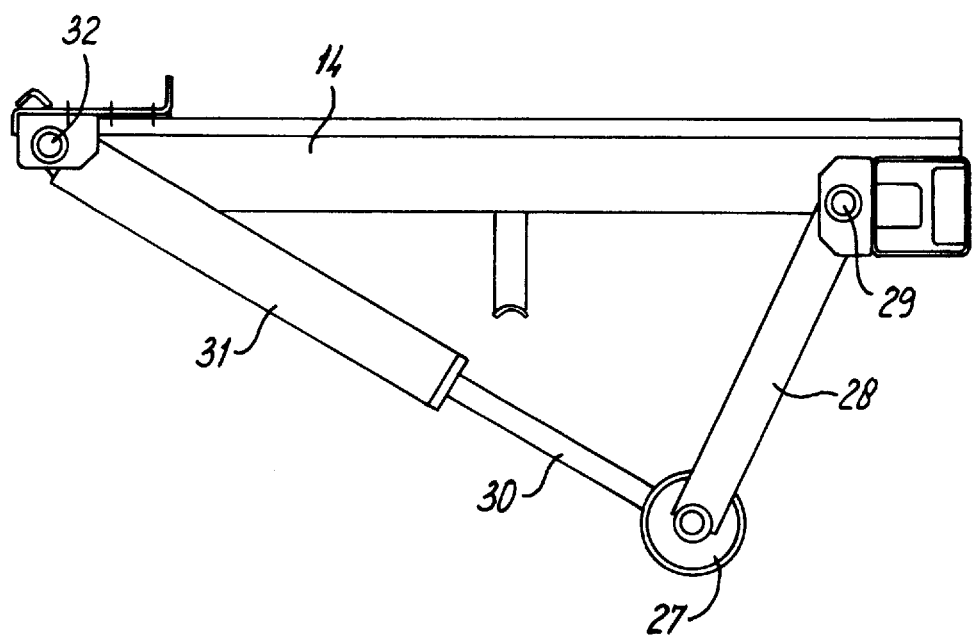

TRANSPORT VEHICLE FOR TAKING UP AND TAKING DOWN CONTAINERS AND THE LIKE ONTO OR FROM A LOADING PLATFORM THEREOF

BACKGROUND OF THE INVENTION

1. Field of the Invention

The invention relates to a transport vehicle for taking up and taking down containers and such loads onto or from a loading platform thereof, having means on the vehicle for engaging such a container or the like at one end and moving the latter with respect to the loading platform when taking up and taking down, the loading platform being mounted on the fixed chassis of the vehicle, the vehicle having wheels on one or more wheel axles near the take-up or take-off end, incorporated in a carrier which, with respect to the fixed chassis of the vehicle and the loading platform, is slidable with said axles between a position where at least one wheel axle is close to said take-up and take-off end, and a position where said wheel axle is at a considerable distance from said end, which carrier, in a vertical plane, adopts a fixed angular position with respect to the carrier, and the vehicle being constructed in such a way that in said latter position of said carrier the loading platform at the take-up or take-off end is able to tilt towards the ground.

2. Description of the Related Art

Such a vehicle is disclosed by NL-A-88.01783 and by U.S Pat. No. 4,026,429. Such vehicles are especially intended and suitable for taking up and setting down long containers, for example so-called forty-feet ISO-containers.

The means for engaging such loads at one end may take many different forms, inter alia as specified in EP-A-151.635 and EP-A-517.824. These make it possible to engage one end of the container to be taken up, after which said end can thereby be placed onto the loading platform and the container, by these means being moved across the loading platform, can be moved onto said loading platform entirely. In practice this is usually effected by driving the vehicle backwards, so that the container remains in its position in a horizontal sense while being taken up.

Such vehicles present problems, especially in the case of heavily laden containers, since the displaceable carrier with wheel axles reaches a slanting position, together with the loading platform, when containers are being taken up and taken off, in many cases even to such an extent that the wheels which are furthest away from the take-up or take-off end are entirely unloaded and are even lifted off the ground, and the wheels which are nearest to that end, together with their axle, suspension and spring system are temporarily loaded very heavily. Moreover, it is difficult, in the case of such long containers, to drive the vehicle backwards exactly in the direction of the container over the distance to be covered, which is fairly large in this instance, so that the container may end up on the loading platform in a skewed position, with all the attendant drawbacks. When containers are set down, it is likewise often important for the correct set-down direction to be maintained, for example when the container is to be connected to a warehouse or store or when the container, having been set down, is used for all sorts of purposes, such as retail sales premises and the like.

SUMMARY OF THE INVENTION

The object of the invention is to improve such a transport vehicle in such a way that one or more of these problems are reduced.

To this end, a vehicle as mentioned in the preamble is characterized, according to the invention, in the first instance by there being disposed on the slidable carrier one or more auxiliary rollers or wheels which have means for moving them up and down, so that they are lifted up when the vehicle is driven on the road, and for forcing them against the ground with some force when a container or the like is being taken up, so that over short distances and at low speed they absorb part of the weight of the vehicle.

By choosing the location of said auxiliary rollers or wheels near the hindmost wheel axle, precisely in the vertical plane through or behind the latter, it is possible to relieve the load on this axle optimally during said taking up or taking down, while, in the lifted position, they do not impede driving on the road. The auxiliary rollers can also be used for pushing the loading platform towards the horizontal position when a container is being taken up, so that, for example, hydraulic cylinders between the loading platform and the fixed section of the chassis need not exert so much force in this direction and the loading platform can be brought into the horizontal position more quickly. Said auxiliary rollers may also, in the case of a smooth road surface, assist in keeping the wheels and the carrier in position more effectively when sliding the loading platform when containers are being taken up and taken off.

As is known, such auxiliary wheels or rollers are customary with so-called semitrailers to support them at the front when they are stationary and no tractor vehicle is present, i.e. normally at the end opposite to that where the auxiliary wheels or rollers according to the invention are disposed.

It is also known, from U.S. Pat. No. 3,454,175, from DE-A-22 22 539, and from DE-A-25 45 934, in the case of transport vehicles, having rear wheels fixedly connected to the chassis for taking up and taking down containers onto or from a loading platform thereof, to fit such auxiliary rollers at the rear end of the fixed chassis in order to increase, as it were, the lever arm opposing an upward tilt of the front end of the vehicle if the load projects far behind it, thus to prevent such tilting. In the invention there is no fixed chassis near the wheels in the slidable carrier, but only a loading platform which, together with said carrier, does have to tilt when containers are being taken up and set down, and the auxiliary rollers can be used purposely to affect said tilting by pushing the auxiliary rollers towards the ground with a desired force, while they remain vertically movable with respect to the carrier and the loading platform to ensure that, while containers are being taken up and taken off, they continue to press against the ground during a required part of the movements performed in the process.

In order to permit easy correction of a situation where the container may end up in a skewed position on the loading platform or is not set down in the correct position, the invention is designed in such a way that the horizontal axes of said rollers or wheels form an angle with the transverse direction of the vehicle, so that, in the pushed-down position of said rollers or wheels, the vehicle moves slightly sidewards at the position of the set of wheels when it is driven forwards or backwards.

The means for engaging such containers at one end are normally guided on the vehicle in such a way that they accurately define the lateral position of that end of the container which they engage, but permit some swivelling in a horizontal plane in order to prevent overloading and fracture if the longitudinal axis of the container does not properly coincide with the longitudinal axis of the vehicle.

By using said auxiliary rollers or wheels having a slanting axis, it is now possible, by pushing them down and driving the vehicle forwards and/or backwards, to correct the mutual angular position of the loading platform and the container, as seen in the horizontal plane, as long as the container is linked to said engaging means at one end and still rests on the ground or another fixed support with its other end.

Preferably, the angle at which said rollers or wheels are inclined with respect to the transverse direction of the vehicle is between 5° and 20°, particularly preferably ±8°.

This aspect of the invention is preferably embodied in such a way that such a roller or wheel is disposed on both sides of the central longitudinal plane of the vehicle, said rollers or wheels being inclined, in terms of their horizontal axes, in the same direction. It is then possible to correct a slanting position in the one direction by driving forward and in the other direction by driving backward.

In many cases it is preferable to use auxiliary rollers or wheels both with and without a slanting axis, behind one another in such a way that those without a slanting axis are situated more towards the rear, i.e. closer to the take-up or take-off end.

The rollers or wheels can be moved up and down by means of hydraulic or pneumatic cylinders, preferably in such a way that the vertical forces acting on said rollers or wheels during the corrective maneuvering do not pass through said cylinders but, in order to improve the interplay of forces and the pivotability, act laterally on a rigid swivel arm carrying said rollers or wheels.

BRIEF DESCRIPTION OF THE DRAWINGS

The invention will now be explained in more detail with reference to the accompanying drawings, in which:

FIG. 1 is a schematic side view of a vehicle according to the invention, constructed as a semitrailer, with a container resting thereon;

FIG. 2 shows a similar side view of this vehicle while a container is being taken up or set down;

FIG. 3 shows a similar view in the position towards the end of taking up;

FIG. 6 shows a side view of a set of auxiliary wheels or rollers behind the hindmost set of wheels.

DESCRIPTION OF THE PREFERRED EMBODIMENT

Figure 4:
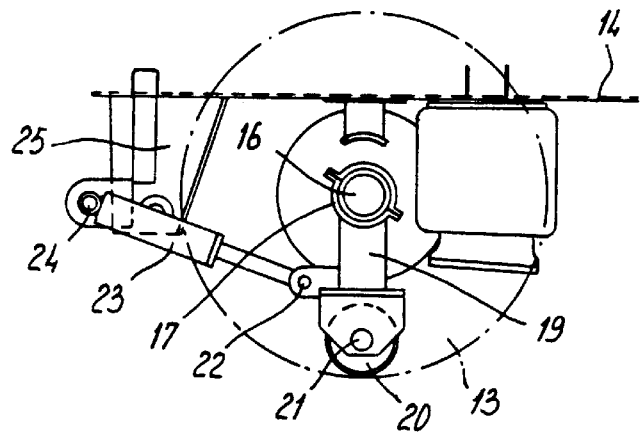
FIG. 4 shows a vertical section through the axle of the hindmost set of wheels.

Many details of the construction are not mentioned and not drawn, but will be clear to those skilled in the art, given the reference to the abovementioned Netherlands and European Patent Applications.

The vehicle of FIGS. 1 to 3 is constructed as a semitrailer, with a tractor vehicle 1 and a fifth-wheel coupling 2 for rotary and tractive linkage to the loading vehicle 3. This coupling can be replaced by a tow hook or tow ring if only said link is also able to transmit vertical forces in both directions. Said coupling or said linking part is located on a tow bar 4 which, at 5, is linked, so as to be pivotable about a transverse axis, to the chassis 6 of the vehicle 3. The chassis 6 carries a loading platform or with its top surface itself forms the loading platform, on which a container 7 can rest. That container can have various shapes and dimensions and in this case is assumed to be a long (e.g. 40 feet) so-called ISO container having corner castings: strong hollow corner pieces having slots into which noncircular lock heads can be introduced and fastened by rotation. On the chassis 6, an upright 8 is disposed, for example provided with winches, from which cables run to a trolley 9 in order to move this across the loading platform. The trolley 9 may have suitable means for engaging the container 7, for example a horizontal cross bar, which carries a locking device at each end each of which can engage a headmost, bottommost corner casting of the container and by rotation about its axis can be locked therein to move this container together with the trolley 9. Other means may be present to engage various types of containers and move them. Examples of such means are specified in the abovementioned European Patent Applications.

A hinged link, drawn as a simple rod 10, between the front ends of tow bar 4 and chassis 6 has means (not drawn) to forcibly vary the distance between said front ends between the positions of FIG. 1 and FIG. 2, for example by said rod itself being constructed as a hydraulic jack or forming the extension of the piston rod of such a cylinder in upright 8. If desired, it is possible to cause this to act, by means of a switchover in the hydraulic system, as a shock absorber which gradually shortens if sufficient pressure in the shortening direction is applied thereto. In the event of large forces, additional hydraulic or other jacks can be disposed between tow bar 4 and chassis 6.

Linked to the chassis 6 in a slidable manner there is a shorter carrier 14 which has three wheel axles 11, 12, 13 behind one another, with customary springs, shock absorbers, possibly stabilizers etc. The carrier 14 is guided laterally with respect to the chassis 6, and the vertical forces therebetween are transmitted by rollers (not drawn), for example supported in hollow girders of one of these constructions.

In FIG. 1, the foremost position of the carrier 14 is shown by dashed lines and indicated by 14', the headmost set of wheels is shown as 11', while the rearmost position thereof is drawn as a continuous line.

There may be means (not drawn) for fixing the carrier 14 with respect to the chassis 6 in the positions of FIG. 1 and FIG. 2, for example holes in upright adjoining walls thereof which move past one another, into which locking pins can be inserted manually or be made to engage automatically if one of those positions has been reached, and can be removed therefrom if that position has to be left. At the front, stops (not drawn) can delimit the forward movement of the carrier 14 with respect to the chassis 6.

The chassis beams 6 may be bevelled, as drawn, at the rear end where they can touch the ground, and rollers (not drawn) may be provided there which project slightly underneath the beams. If required, the rear-most section of the chassis 6 may be linked to the chassis beams in such a way that it can be detached and attached in situ or can be slid in or out to some extent.

This vehicle then functions as follows: In the state of FIG. 1, a container 7 located on the vehicle can be conveyed to any location required by tractor vehicle 1 which, via the fifth-wheel coupling 2, engages the vehicle and supports it at its front end. If said container has to be taken down from the vehicle, the wheels 11, 12 and 13 are braked and any locking pins present as mentioned are removed, so that the chassis 6 can slide across the carrier 14. The vehicle is then moved backwards with the aid of the tractor vehicle. The chassis beams 6 with the container thus slide backwards with respect to the presently stationary carrier 14. By means of the rod construction 10, tilting of the chassis 6 can be controlled.

In the tilted position, the chassis 6 rests on the ground with its rear end. The container 7 now likewise touches the ground with its rear end, or can be set into that position by causing the trolley 9 to move slightly backwards.

The brakes of the wheels are now released, and the vehicle is driven forward. Normally this is done by allowing the vehicle to move forward, the container 7 in its slanting position pushing the vehicle forward and the cables which link the winches at 8 to the trolley 9 being held under a desired tensile force with suitable control by, for example, the hydromotor having a controlled non-return valve, which drives the winches. The rod 10 can now be locked in the longitudinal position it has adopted. The container remains stationary owing to friction of its rear end with the ground. The front end of the container remains linked to the trolley 9, and said trolley thus runs backward with respect to and via the chassis 6, until the vehicle has gone sufficiently far forward for the container to stand on the ground in its entirety and the trolley 9 to be able to be uncoupled therefrom.

The vehicle can now again be brought into the mutual position of the components as shown in FIG. 1, and after the carrier 14 has been locked with respect to the chassis, can drive away.

If a container has to be taken up onto the empty chassis, the actions of releasing the carrier 14 with respect to the chassis 6, applying the brakes of the wheels, driving the vehicle backwards while the carrier 14 is left standing, driving the trolley 9 backwards and tilting the chassis 6 are repeated, whereupon the trolley 9 can engage the container to be taken up, whereupon the container is pulled onto the chassis 6 by relative forward movement of the trolley 9, while the vehicle runs backwards with unbraked wheels, so that the container is not dragged over the ground when thus being taken up. As a matter of fact it is possible, in this case, to use the cables between the winches at 8 and the trolley 9 coupled to the container to pull the vehicle under the container by driving said winches. The chassis then tilts back into the horizontal position of FIG. 1 by rod 10 being shortened or by said link being allowed to act as a shock absorber by weight displacements taking place as described, whereupon the wheels are braked once more, the vehicle is moved forward, while the carrier 14 is left standing, and the carrier 14 is then again locked to the chassis 6 as described.

In intermediate positions such as that of FIG. 2, the container 7 is retained at 9 by its front end, and its rear end rests on the ground, while the supporting surface of chassis 6 does not otherwise touch the underside of the container but is directed towards the ground at a larger angle. In the case of long transport vehicles, for example for 40-feet containers, it is thus necessary to have the vehicle cover quite a considerable distance forward or backward in order to set the container down or take it up in its entirety, and in the process it is easily possible for the longitudinal axis of the vehicle, as seen in a horizontal plane, to end up in a slanting position with respect to the longitudinal axis of the container. This can then readily be corrected by the means now to be described with reference to FIGS. 4 and 5. Disposed on the carrier 14, near the hindmost wheels 13, preferably at the hollow fixed axle 16 of said wheels, there are two swivel arms 19. They grip around said axle by means of a sleeve 17 and each, at their bottom end, carry a roller 20 whose axis 21 forms an angle, preferably of about 8°, see FIG. 5, in a horizontal plane with the transverse direction of the vehicle. The two arms 19 can be linked by a crosslink (not drawn), which link is acted upon, at 22, in a hinged manner by a hydraulic or pneumatic cylinder 23. Said cylinder, on the other hand, is linked in a hinged manner, at 24, to the carrier 14, for example to a crosslink between the spring carrier arms 25.

Said cylinder 23 can thus bring the rollers 20 into the position drawn in FIG. 4 and keep them there and, by shortening, can swivel said rollers to the left and upward in such a way that they do not get in the way during driving on the road. In the drawn state, the rollers 20 extend sufficiently far downwards to relieve the wheels 11 of some of the pressure. If the vehicle is then driven forward or backward, it will to some extent be displaced in a slanting manner, as shown by the arrow 26 in FIG. 5. Driving forward thus enables a positional correction with respect to the container in the one transverse direction, and driving backward enables a positional correction in the other transverse direction, by relatively small displacements of the vehicles and in a readily controllable manner.

Instead of this or in conjunction therewith, a construction such as that of FIG. 6 can be used, at the location of said hindmost wheels 13 or behind the latter. In FIGS. 2 and 3, said construction is disposed behind them. Square rollers 27, i.e. whose axes are transverse to the longitudinal direction of the vehicle, are present on a framework 28 which is linked in a hinged manner to the rear end of the carrier 14 at 29. There are, for example, four such rollers next to one another on the same axle. Between said rollers, a piston rod 30 of a hydraulic cylinder 31 acts on the axle of the rollers, said cylinder being disposed in a hinged manner, at 32, on the carrier 14. By extending the cylinder 31, the rollers 27 can be pressed against the ground with a desired force and especially the hindmost wheels 13 can therefore be relieved of part of the load in intermediate positions such as those of FIGS. 2 and 3, whereas good matching of forces is possible in the interplay between the forces acting on rod construction 10.

Figure 5:
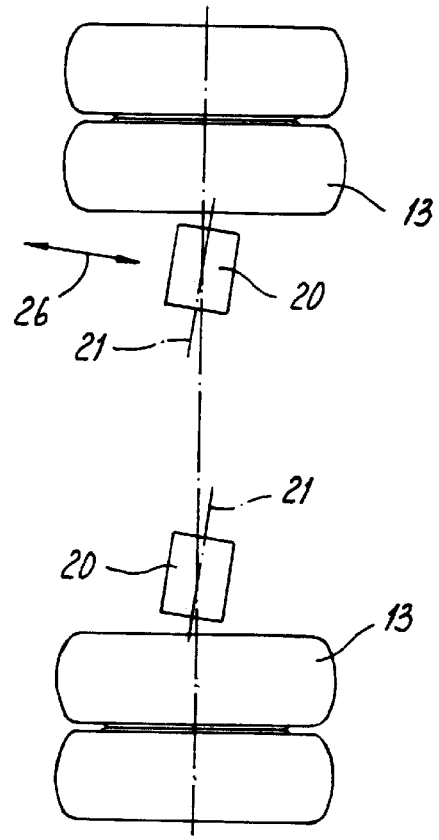
FIG. 5 shows a schematic top view of said hindmost set of wheels, omitting the axle and many other construction components.

The constructions of FIGS. 4 and 5 can, if desired, be combined with the one of FIG. 6 by an arrangement, within one framework such as 28 which can be swivelled downwards, of square and slanting rollers using separate means such as a shaft having eccentric parts, which, if rotated, serves the purpose of selectively bringing into contact with the ground the slanting rollers of FIGS. 4 and 5 or the square rollers of FIG. 6, although this does additionally require a hydraulic cylinder or another motor component in order to thus rotate said shaft. A separate embodiment as described has the advantage that the positional correction by means of the slanting rollers and the load relief of the wheels 13 can be carried out separately and thus only dependent on the desirability of each, i.e. a positional correction when positional deviations occur and a load relief of the wheels 13 for example only in the case of heavily laden containers.

Instead of cylinders, such as 23 and 31 of FIGS. 4 and 6, air spring bellows as drawn on the right in FIG. 4, known to be used in spring systems of trucks, could be used with or without a hinged or lever link to the rollers 20, 27. In such an arrangement, the rollers could be directly attached to the bottom side of such bellows or to the lower side of a beam which links two such sets of bellows.

I claim:

1. Transport vehicle designed to accommodate loading and unloading containers (7), comprising:

a fixed chassis (6);

a loading platform (3) mounted onto the fixed chassis (6), the loading platform (3) being designed to accept the containers (7);

engaging means (8, 9) for engaging one of the containers (7) at one end thereof and controlling movement of the container (7) with respect to the loading platform (3) during loading and unloading;

a carrier (14) slidably attached to the fixed chassis (6), the carrier (14) having at least one axle perpendicular to a longitudinal centerline of the vehicle with attached wheels (11, 12, 13), the carrier (14) being slidabe in a longitudinal direction with respect to the fixed chassis (6) of the vehicle and the loading platform (3) between a rearward position in which a rearmost (16) of the at least one axle is close to an aft end of the loading platform (3), and a forward position in which the rearmost axle (16) is at a greater distance form the aft end, the carrier (14) being in a fixed angular position with respect to the chassis (6), and the vehicle being constructed such that when the carrier (14) is in the forward position, the loading platform (3) is able to tilt towards a surface beneath the vehicle at the aft end;

one or more auxiliary rollers or wheels (20, 27) disposed on the carrier (14); and vertical movement means (23, 31) for controlling vertical displacement of the auxiliary roller or wheels (20, 27);

wherein the vertical movement means (23, 31) is able to lift the auxiliary rollers or wheels (20, 27) away from the surface under normal driving conditions, the vertical movement means (23, 31) also being able to force the auxiliary rollers or wheels (20, 27) against the surface beneath the vehicle during loading and unloading of the container (7), the vertical movement means (23, 31) being able to absorb part of a weight of the vehicle as the vehicle travels short distances at low speed while loading and unloading; and wherein the auxiliary rollers or wheels (20) rotate about axes (21) which lie at a fixed angle to the at least one axle, such that forward or rearward movement of the vehicle with the auxiliary rollers or wheels (20) in contact with the surface beneath the vehicle introduces a fixed lateral component to the movement.

2. The vehicle of claim 1, wherein the fixed angle is in the range of 5° to 20°.

3. The vehicle of claim 1, wherein the auxiliary rollers or wheels (20) rotate about parallel axes (21) and are disposed on both sides of a vertical plane passing through the longitudinal centerline of the vehicle.

4. The vehicle of claim 1, wherein the auxiliary rollers or wheels include both angled auxiliary rollers or wheels (20) which rotate about axes which lie at a fixed angle to the axles, and non-angled auxiliary rollers or wheels (27) which rotate about axes parallel to the axles, the angled and non-angled auxiliary rollers or wheels (20, 27) being operable independent of one another through separate vertical movement means.

5. The vehicle of claim 4, wherein the angled auxiliary rollers or wheels (20) are situated closer to the rearmost axle than are the non-angled auxiliary rollers or wheels (27).

6. The vehicle of claim 2, wherein the fixed angle is approximately 8°.

* * * * *